United States Patent
Wu

(10) Patent No.: US 9,887,565 B2
(45) Date of Patent: Feb. 6, 2018

(54) FISHING LURE POWER CHARGING DEVICE

(71) Applicant: TOP CASTLE HOLDINGS LTD., Miami, FL (US)

(72) Inventor: Chung Wen Wu, Keelung (TW)

(73) Assignee: Top Castle Holdings Ltd., Miami, FL (US)

( * ) Notice: Subject to any disclaimer, the term of this patent is extended or adjusted under 35 U.S.C. 154(b) by 163 days.

(21) Appl. No.: 14/951,796

(22) Filed: Nov. 25, 2015

(65) Prior Publication Data

US 2017/0149259 A1     May 25, 2017

(51) Int. Cl.
| | |
|---|---|
| *A01K 85/00* | (2006.01) |
| *H02J 7/00* | (2006.01) |
| *A01K 85/01* | (2006.01) |
| *H02J 7/35* | (2006.01) |
| *H02J 50/90* | (2016.01) |

(52) U.S. Cl.
CPC ............ *H02J 7/0044* (2013.01); *A01K 85/01* (2013.01); *H02J 7/0047* (2013.01); *H02J 7/0052* (2013.01); *H02J 7/0042* (2013.01); *H02J 7/35* (2013.01); *H02J 7/355* (2013.01); *H02J 50/90* (2016.02)

(58) Field of Classification Search
None
See application file for complete search history.

(56) References Cited

U.S. PATENT DOCUMENTS

| | | | | |
|---|---|---|---|---|
| 4,669,213 A | * | 6/1987 | LeRoy ................... | A01K 85/01 43/17.6 |
| 5,157,857 A | * | 10/1992 | Livingston ............. | A01K 93/02 43/17 |
| 5,175,951 A | | 1/1993 | Fruchey | |
| 5,697,182 A | * | 12/1997 | Rodgers ................. | A01K 85/01 43/17.1 |
| 6,029,388 A | * | 2/2000 | Yokogawa ............. | A01K 85/01 43/17.5 |
| 6,647,659 B1 | * | 11/2003 | King ...................... | A01K 85/01 43/17.6 |
| 6,796,077 B1 | * | 9/2004 | Dupree ................... | A01K 85/01 43/17.6 |
| 6,807,766 B1 | * | 10/2004 | Hughes ...................... | A61F 5/48 43/17.1 |
| 6,922,935 B2 | * | 8/2005 | Yu .......................... | A01K 85/01 43/17.6 |

(Continued)

*Primary Examiner* — Leigh Garbowski
(74) *Attorney, Agent, or Firm* — Rosenberg, Klein & Lee

(57) ABSTRACT

A fishing lure power charging device includes a body. A circuit board is assembled in the body. The circuit board has a power switching circuit and a charging circuit. A light emitter is assembled in the body and electrically connected to the power switching circuit, so that the light emitter emits light when the light emitter is electrically conducted. A battery is assembled in the body and electrically connected to the charging circuit, so that the battery is chargeable. Two conductive members are electrically connected to the circuit board, separately assembled to the body, and exposed from the body. A light sensing switch is assembled to the body and electrically connected to the circuit board, so that the light sensing switch switches the two conductive members to conduct with the power switching circuit or the charging circuit based on the light illuminating on the light sensing switch.

6 Claims, 5 Drawing Sheets

(56) References Cited

U.S. PATENT DOCUMENTS

| | | | |
|---|---|---|---|
| 7,707,764 B1 | 5/2010 | Osburn | |
| 8,881,446 B2 | 11/2014 | Gao | |
| 8,950,105 B2 * | 2/2015 | Thomas | A01K 85/01 43/17.1 |
| 9,441,832 B2 * | 9/2016 | Bushee | F21V 33/0008 |
| 9,445,583 B1 * | 9/2016 | Aanenson | A01K 85/01 |
| 9,700,029 B2 * | 7/2017 | Mann | H01R 13/5213 |
| 2006/0010763 A1 * | 1/2006 | Podlewski | A01K 85/16 43/17.6 |
| 2008/0202014 A1 * | 8/2008 | Palermo | A01K 85/01 43/26.2 |
| 2008/0271358 A1 * | 11/2008 | Meroney | A01K 85/16 43/26.2 |
| 2014/0026465 A1 * | 1/2014 | Braun | A01K 85/01 43/17.6 |
| 2017/0071177 A1 * | 3/2017 | Mann | H01R 13/5213 |

* cited by examiner

FISHING LURE POWER CHARGING DEVICE

BACKGROUND OF THE INVENTION

Field of the Invention

The present invention relates to a fishing tool, and more particularly to a fishing lure power charging device.

Description of the Prior Art

The fishing lures may be divided into true lures and fake lures, and the fake lures may be further divided into rigid lures and soft lures. Some of the rigid lures may generate sounds or lights, and fishers choose these lures based on their needs.

As a fishing lure disclosed in U.S. Pat. No. 5,175,951, although the fishing lure has a contact type sensor switch for generating sounds or lights, the fishing lure is devoid of charging circuit, so that the battery has to be replaced once the battery is run out of power.

And, as a fishing lure disclosed in U.S. Pat. No. 7,707,764, although the fishing lure has a contact type sensor switch for generating sounds or lights and also has a charging circuit for connecting with an external power supply to charge the fishing lure, the mechanism how to switch between the power switching circuit of the sensor switch and the charging circuit is not known.

Further, as a fishing lure disclosed in U.S. Pat. No. 8,881,446, the fishing lure has a contact type sensor switch for generating sounds or lights and also has a charging circuit for connecting with an external power supply to charge the fishing lure. In addition, the switching between the power switching mode and the charging mode is achieved by contacting the sensor switch. However, in operation, a user can obtain the state of the fishing lure by contacting the sensor switch. In addition of the inconvenience, when the user unintentionally allows the fishing lure to be charged under the power switching mode, the circuit board may be damaged because of short circuit.

The present invention is, therefore, arisen to obviate or at least mitigate the above mentioned disadvantages.

SUMMARY OF THE INVENTION

One object of the present invention is to solve the aforementioned problems and provide a fishing lure power charging device, its charging mode and power switching mode can be switched by a light sensing switch, thereby providing convenience to users.

To achieve the above and other objects, the fishing lure power charging device comprises a body. A circuit board is assembled in the body. The circuit board has a power switching circuit and a charging circuit. A light emitter is assembled in the body and electrically connected to the power switching circuit, so that the light emitter emits light when the light emitter is electrically conducted. A battery is assembled in the body and electrically connected to the charging circuit, so that the battery is chargeable. Two conductive members are electrically connected to the circuit board, separately assembled to the body, and exposed from the body. A light sensing switch is assembled to the body and electrically connected to the circuit board, so that the light sensing switch switches the two conductive members to conduct with the power switching circuit or the charging circuit based on the light illuminating on the light sensing switch.

Wherein, the body has a sealed and waterproof receiving space. The circuit board, the light emitter, the battery, and the light sensing switch are assembled in the receiving space. The two conductive members are assembled on a wall of the body which defines the receiving space, and the two conductive members are exposed from the inner surface of the wall and electrically connected to the circuit board.

Wherein, the body is formed by connecting two half shells which are connected with each other. The two conductive members are respectively assembled to the two half shells. Each of the conductive members is formed along with the manufacturing of the corresponding half shell, and the portion of each of the half shells around the corresponding conductive member is sealed and waterproof.

Wherein, a vibrator is assembled in the receiving space of the body and electrically connected to the power switching circuit.

Wherein, the light emitter and the light sensing switch are assembled on the circuit board.

Wherein, the body has a light permeable portion at a portion corresponding to the light sensing switch and provided for passing light, so that the light sensing switch senses the light.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Please refer to FIGS. 1 to 5, illustrating embodiments of a fishing lure power charging device. The figures are provided for illustrative purposes and not limitations to the present invention.

Figure 1:
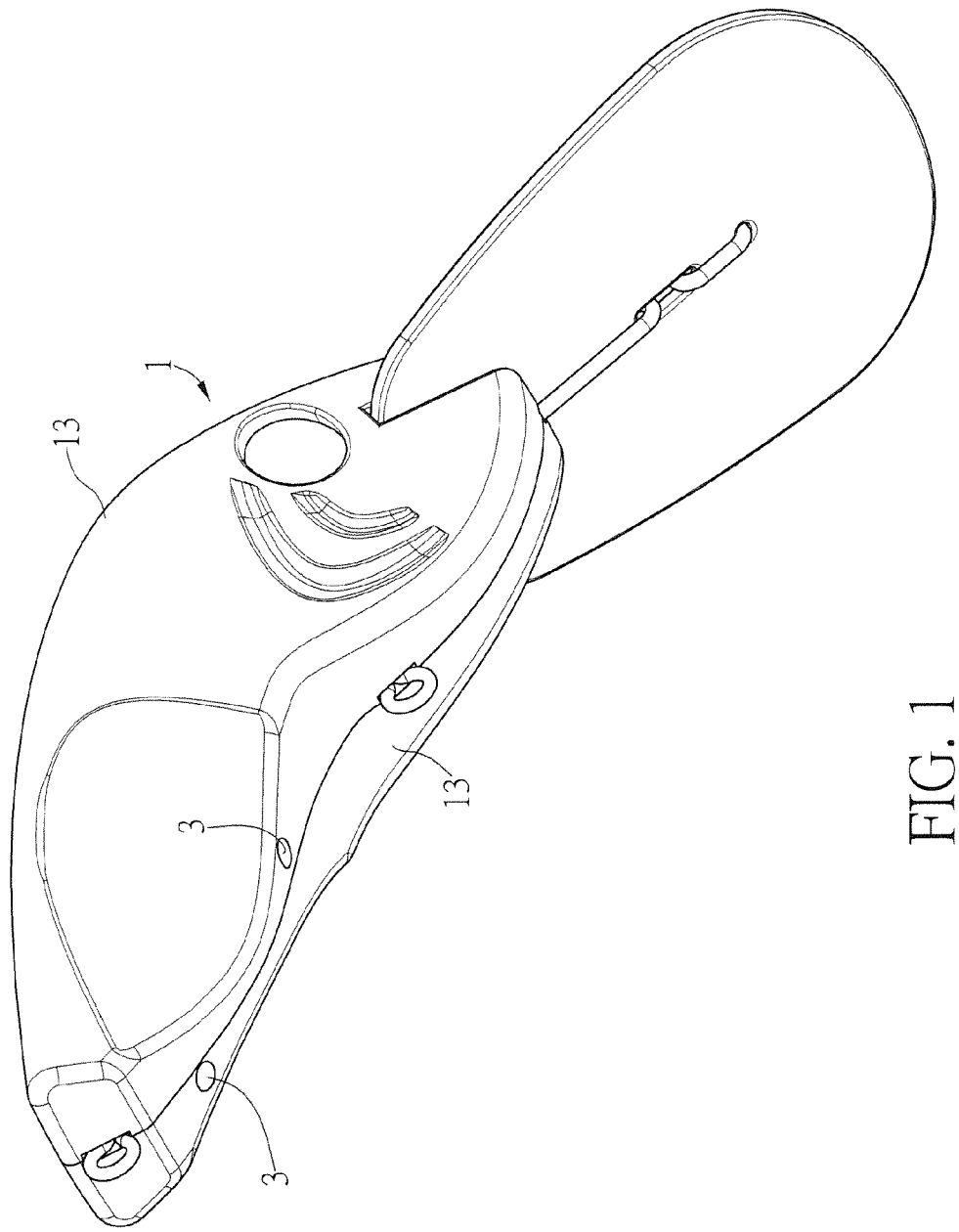
FIG. 1 illustrates a perspective view of a fishing lure according to the present invention.
Figure 2:
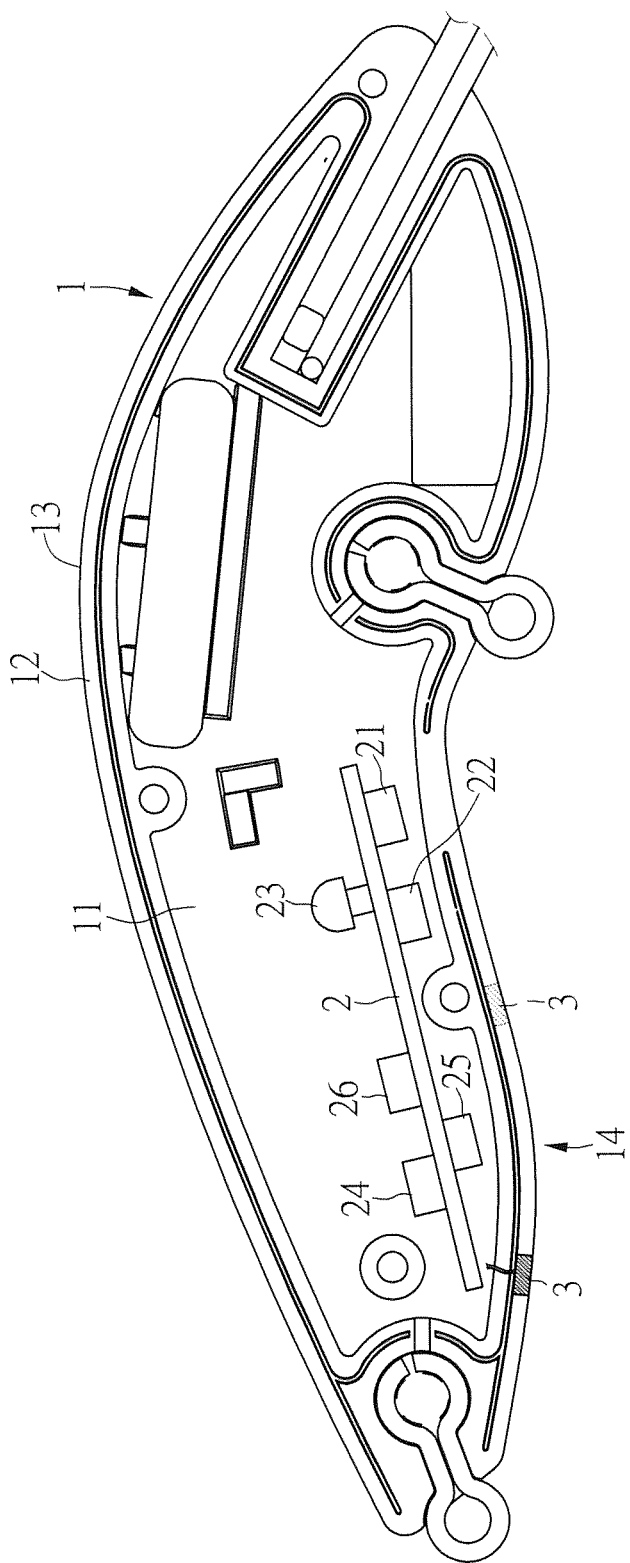
FIG. 2 illustrates a sectional view of the fishing lure according to the present invention.
Figure 3:
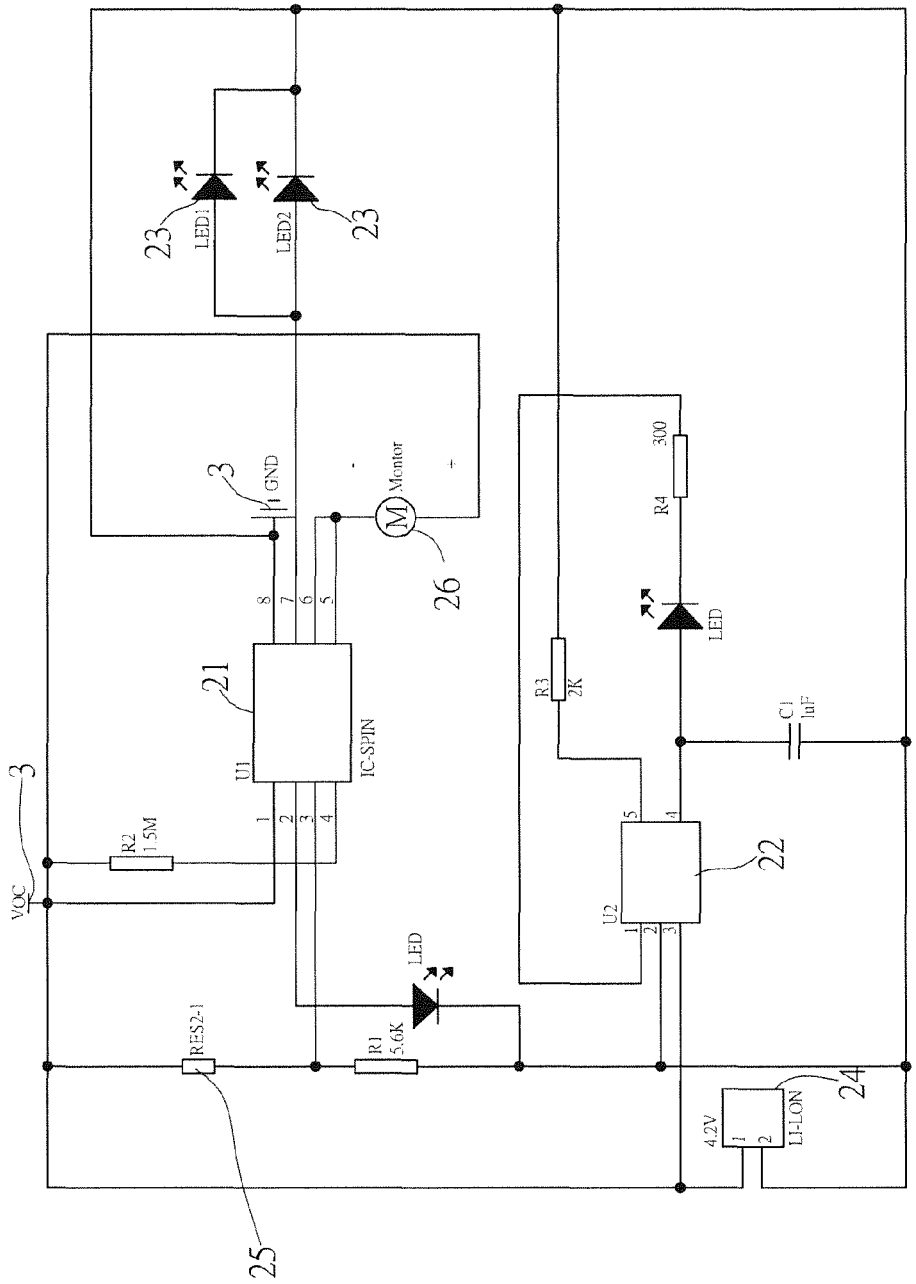
FIG. 3 illustrates a circuit diagram of the fishing lure according to the present invention.

In this embodiment, a fishing lure power charging device is provided. As shown in FIGS. 1 to 3, the device comprises a body 1. A circuit board 2 is assembled in the body 1. The circuit board 2 has a power switching circuit 21 and a charging circuit 22. A light emitter 23 is assembled in the body 1 and electrically connected to the power switching circuit 21, so that the light emitter 23 emits light when the light emitter 23 is electrically conducted. A battery 24 is assembled in the body 1 and electrically connected to the charging circuit 22, so that the battery 24 is chargeable.

As shown in FIGS. 1 to 3, two conductive members 3 are electrically connected to the circuit board 2, and the two conductive members 3 are separately assembled to the body 1 and exposed from the body 1. A light sensing switch 25 is assembled to the body 1 and electrically connected to the circuit board 2, so that the light sensing switch 25 switches the two conductive members 3 to conduct with the power switching circuit 21 or the charging circuit 22 based on the light illuminating on the light sensing switch 25.

As shown in FIGS. 1 to 3, in this embodiment, the body 1 has a sealed and waterproof receiving space 11. The circuit board 2, the light emitter 23, the battery 24, and the light sensing switch 25 are assembled in the receiving space 11. The two conductive members 3 are assembled on a wall 12 of the body 1 which defines the receiving space 11, and the two conductive members 3 are exposed from the inner surface of the wall 12 and electrically connected to the circuit board 2.

Figure 4:
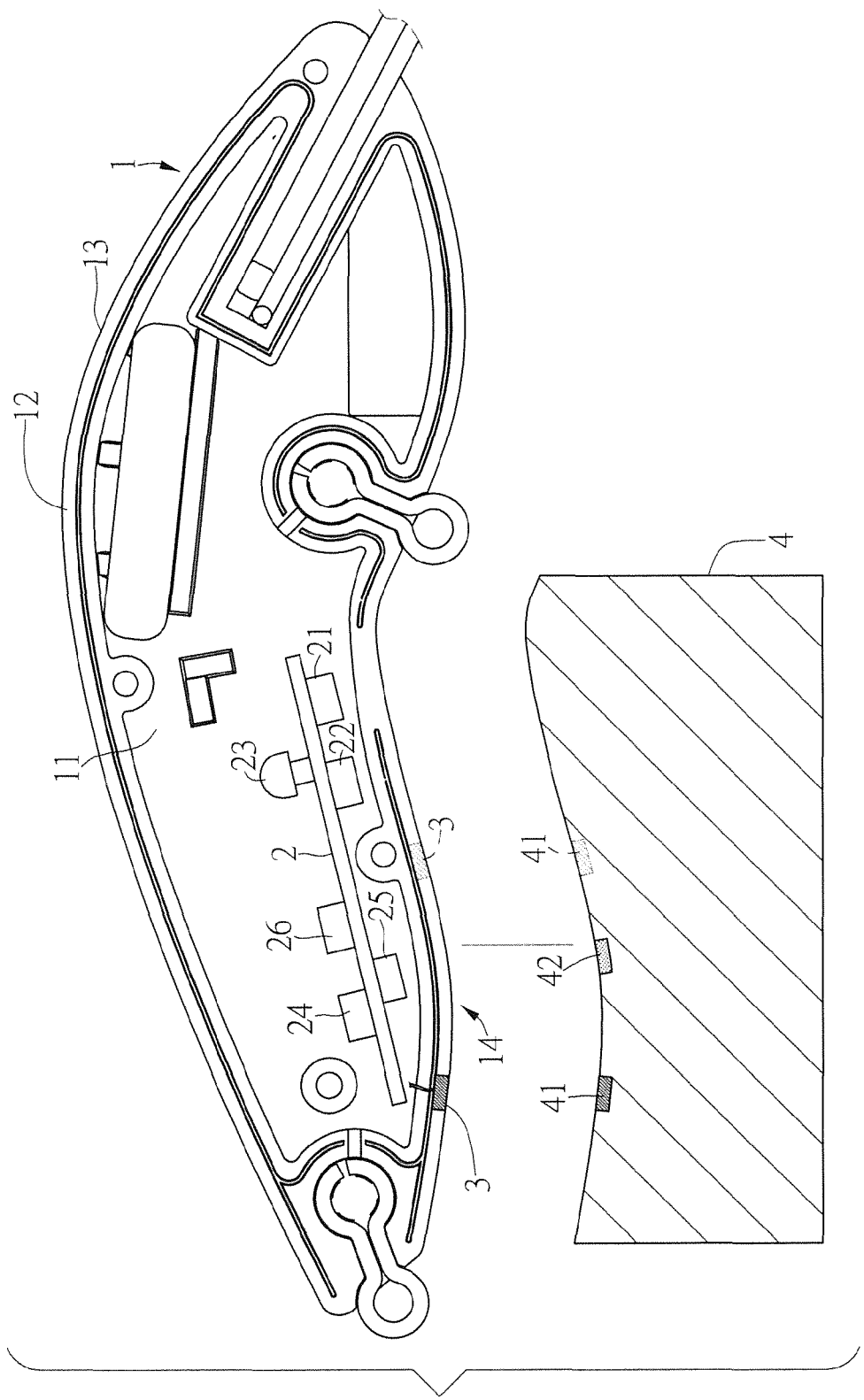
FIG. 4 illustrates a schematic sectional view showing the fishing lure is placed in a charger.
Figure 5:
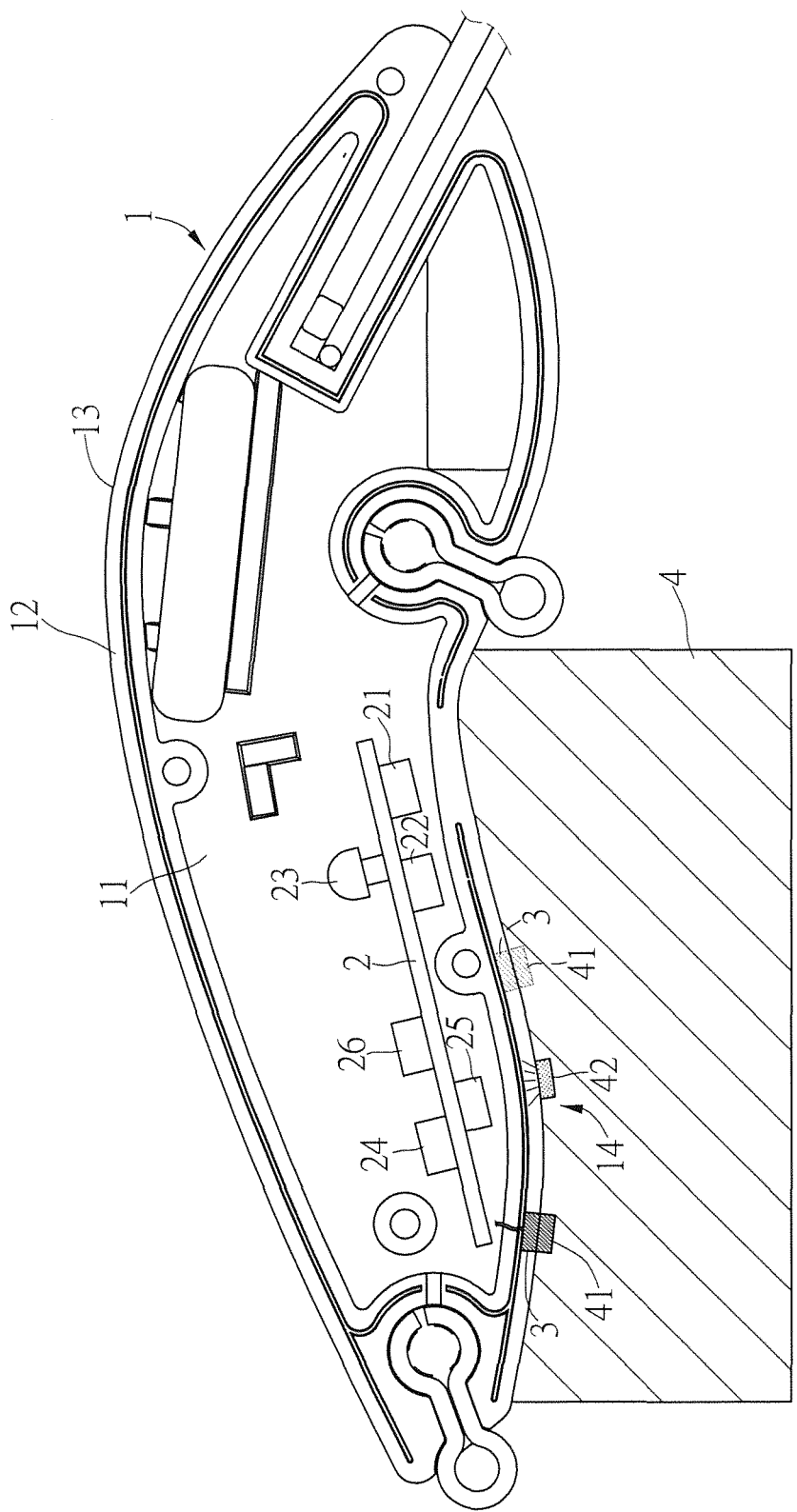
FIG. 5 illustrates an operational schematic view showing the fishing lure is charged by the charger.

As shown in FIG. 1, in this embodiment, the body 1 is formed by two half shells 13 which are connected with each other. The two conductive members 3 are respectively assembled to the two half shells 13. Each of the conductive members 3 is formed along with the manufacturing of the corresponding half shell 13, and the portion of each of the half shells 13 around the corresponding conductive member 3 is sealed and waterproof. As shown in FIG. 2, FIG. 4, and FIG. 5, only one half shell 13 is illustrated in the figures for indicating the positions of the two conductive members 3, and the conductive member 3 assembled to the not-shown half shell 13 is represented by dot lines.

As shown in FIGS. 2 to 3, in this embodiment, the light emitter 23 and the light sensing switch 25 are assembled on the circuit board 2. Moreover, in this embodiment, a vibrator 26 is assembled in the receiving space 11 of the body 1 and electrically connected to the power switching circuit 21. In addition, in this embodiment, the body 1 has a light permeable portion 14 at a portion corresponding to the light sensing switch 25 and provided for passing light, so that the light sensing switch 25 senses the light.

In this embodiment, the fishing lure is at a power switching mode when the light sensing switch 25 is not illuminated and sensed. Under this arrangement, the power switching circuit 21 can be conducted when an electrical conductive member is in contact with the two conductive members 3, e.g., when the body 1 is thrown into a fishing pool to be in contact with the water, or when the two conductive members are in contact with the fingers of a user's one hand. Accordingly, the light emitter 23 and the vibrator 26 in the receiving space 11 can be actuated, so that the fishes may be attracted to bite the fishing lure.

When the light sensing switch 25 is illuminated by light, the state of the fishing lure is automatically switched from the power switching mode to a charging mode. For example, as shown in FIGS. 4 to 5, a charger 4 adapted to charge the fishing lure comprises two charging conductive units 41 and a light emitting diode 42. The position of the light emitting diode 42 corresponds to the light permeable portion 14 when the body 1 is placed in the charger 4. When the body 1 is placed in the charger 4 and when the two conductive members 3 are in contact with the respective two charging conductive units 41, the light emitted by the light emitting diode 42 illuminates on the light sensing switch 25 through the light permeable portion 14, so that the light sensing switch 25 switches the power switching mode to the charging mode, and then the battery 24 can be charged. As shown in FIGS. 4 to 5, to match with the conductive members 3 shown in dot lines and to illustrate each of the conductive members 3 is in contact with the corresponding charging conductive unit 41, the charging conductive unit 41 corresponding to the conductive member 3 shown in dot lines is also illustrated by dot lines.

Based on the above, the present invention has following advantages. Since the light sensing switch 25 can automatically switch the fishing lure between the power switching mode for the power switching circuit 21 and the charging mode for the charging circuit 22 when the light sensing switch 25 is illuminated by light, a user can ensure the fishing lure is in the power switching mode when the light sensing switch 25 is not illuminated (for instance, in the case of the body 1 is not assembled to the charger 4) or in the charging mode when the light sensing switch 25 is illuminated (for instance, in the case of the body 1 is assembled to the charger 4 and the light sensing switch 25 is illuminated by the light emitting diode 42). Therefore, when a user places the body 1 in the charger 4, the fishing lure is in the charging mode so that the battery 24 can be charged; conversely, when the user detaches the body 1 from the charger 4, the fishing lure is in the power switching mode, so that the user can use the fishing lure to attract fishes. Therefore, as compared with the existing fishing lure, the user can use the fishing lure according to the present invention conveniently.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A fishing lure power charging device comprising:
a body;
a circuit board s assembled in the body, the circuit board having a power switching circuit and a charging circuit;
a light emitter assembled in the body and electrically connected to the power switching circuit, the light emitter emitting light when the light emitter is electrically driven thereby;
a battery assembled in the body and electrically connected to the charging circuit, the battery being chargeable;
two conductive members separately assembled to the body, electrically connected to the circuit board, and exposed from the body;
an external charger including a light source disposed thereon; and
a light sensing switch assembled to the body and electrically connected to the circuit board, wherein the light sensing switch switches for alternative activation of the power switching circuit or the charging circuit based on light generated by the light source of the external charger illuminating on the light sensing switch, the charging circuit being driven responsive to the external charger detachably coupled thereto through the two conductive members.

2. The fishing lure power charging device according to claim 1, wherein the body has a sealed and waterproof receiving space, the circuit board, the light emitter, the battery, and the light sensing switch are assembled in the receiving space, the two conductive members are assembled on a wall of the body which defines the receiving space, and the two conductive members are exposed from the inner surface of the wall and electrically connected to the circuit board.

3. The fishing lure power charging device according to claim 2, wherein the body is formed by two half shells which are connected with each other, the two conductive members are respectively assembled to the two half shells, each of the conductive members is formed along with the manufacturing of the corresponding half shell, the portion of each of the half shells around the corresponding conductive member is sealed and waterproof.

4. The fishing lure power charging device according to claim 2, wherein a vibrator is assembled in the receiving space of the body and electrically connected to the power switching circuit.

5. The fishing lure power charging device according to claim 1, wherein the light emitter and the light sensing switch are assembled on the circuit board.

6. The fishing lure power charging device according to claim 1, wherein the body has a light permeable portion at a portion corresponding to the light sensing switch and provided for passing light, so that the light sensing switch senses the light.

\* \* \* \* \*